March 5, 1957  F. W. HELMS  2,783,906
HARVESTER GRAIN CONVEYOR
Filed Nov. 25, 1953
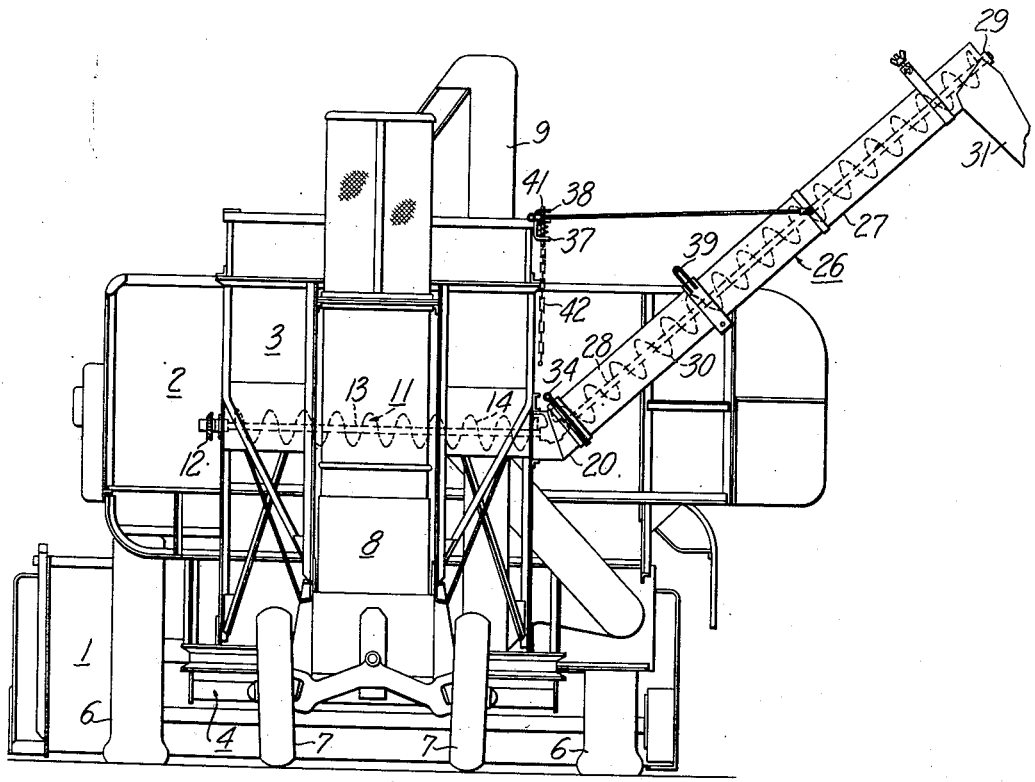
Fig. 1
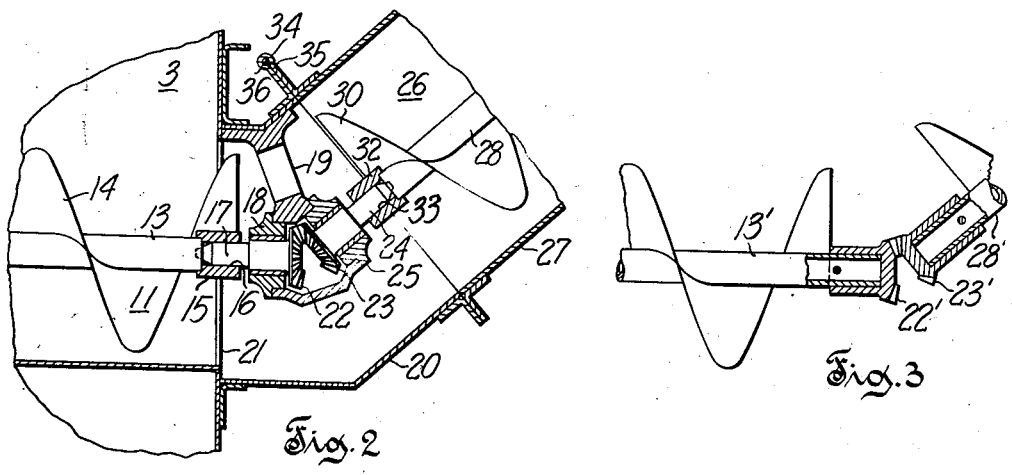
Fig. 2
Fig. 3
Inventor
Frank W. Helms
by Jennette Plackwell
Attorney United States Patent Office 2,783,906
Patented Mar. 5, 1957

2,783,906

HARVESTER GRAIN CONVEYER

Frank W. Helms, La Porte, Ind., assignor to Allis-Chalmers Manufacturing Company, Milwaukee, Wis.

Application November 25, 1953, Serial No. 394,415

2 Claims. (Cl. 214—519)

This invention relates to harvesting machines and it is concerned more particularly with an improved auger type conveyer for the handling of harvested material such as grain.

In combine harvesters, particularly of the self-propelled type, a horizontally extending auger type conveyor is commonly used to move harvested grain out of a grain bin and into a laterally upwardly extending auger type conveyer which is connected to the discharge end of the horizontal conveyer by means of a universal joint. The purpose of the upwardly extending conveyer is to elevate the harvested grain and discharge same into a truck or wagon which has been driven up alongside the harvester. Quite often it is desirable to perform this grain unloading process while the harvester continues to move through the field harvesting grain, but such operation may be rendered difficult or impossible by excessive vibration of the upwardly extending conveyer. Such vibration difficulties are apt to result, at least in part, from the use of a universal joint between the augers of the horizontal and upwardly extending conveyers if the universal joint is of conventional construction which causes periodic change in angular velocity between its input and output elements. The sheet metal used for the conveyer housing is ordinarily fairly light gauge and excess vibration has a deleterious effect on the fittings and alignment.

Generally, it is an object of the present invention to provide an improved conveyer system for harvesting machines which avoids the difficulties, and particularly the vibration difficulties, of heretofore known systems in a practical and fully satisfactory manner.

Another object of this invention is to provide means for conveying material from one auger conveyer to another where the axes of the two augers are at a substantial angle to each other and without any change in the angular velocity of the two augers.

Another object of this invention is to provide means for conveying material from one auger conveyer to another where the axes of the two augers intersect but are substantially out of alignment and without interfering with the passage of material from one auger to the other.

It is a further object of this invention to provide an improved connection between the ends of angularly disposed augers and which connection occupies a minimum of space.

Another object of this invention is to provide a fully enclosed power transmitting connection between the ends of angularly disposed augers and which will cause no velocity changes between augers which may result in objectionable vibrations of the augers and their mountings.

In the accompanying sheet of drawing illustrating an example of the invention:

Fig. 1 is a rear elevation of a self-propelled combine harvester incorporating an unloading system according to the invention;

Fig. 2 is an enlarged sectional view of a part of a grain bin and associated conveyer parts incorporated in the harvester shown in Fig. 1; and Fig. 3 is a view similar to Fig. 2 of modified auger shafts partially in section.

Referring to Fig. 1 it is seen that a self-propelled harvester is provided including a cutting and conveying mechanism 1, a threshing and separating mechanism 2, and a grain or material storage bin 3; all of these mechanisms being positioned on a frame structure chassis 4 including front traction wheels 6 and dirigible wheels 7. Also mounted on chassis 4 is an engine 8 operatively connected to the mentioned mechanisms. A grain elevator 9 is mounted adjacent the discharging portion of separating mechanism 2 in grain receiving relation thereto. Grain is moved by elevator 9 and discharged into grain bin 3. A transversely horizontally extending unloading auger type conveyer 11 is journaled at one end in a side wall of grain bin 3 just above the floor thereof and is drivenly connected through gearing 12, attached to that end of conveyer 11 to engine 8 by other suitable drive connections (not shown).

Conveyer 11 includes a drive shaft 13 about which helical flighting 14 is attached. The other end of conveyer 11 has a coupling element 15 attached thereto. Coupling element 15 is provided with a transversely extending aperture 16 therethrough of square cross section. Received within aperture 16 is a stub shaft 17 having a square cross section portion complementary to aperture 16. Stub shaft 17 is journaled in a bear 18 carried by a bracket 19 mounted on an elbow tube 20 attached to grain bin 3. Tube 20 has a generally horizontal inlet section secured to the grain bin 3, and an outlet section which extends on an upwardly inclined axis from the inlet section. A portion of flighting 14 extends through aperture 21 in the lower right hand side of grain bin 3 (as viewed in Fig. 2). The horizontal inlet section of tube 20 is secured to the bin 3 in registry with aperture 21 and in coaxial relation with bearing 18. A driving bevel gear 22 is attached to an end portion of stub shaft 17 adjacent bearing 18. If desired a gear 22' can be attached directly to a drive shaft 13' as is shown in Fig. 3, but for ease of assembly the use of a stub shaft fitting into shaft 13 as shown in Fig. 2 is preferred. A driven bevel gear 23 (see Fig. 2) in mesh with driving bevel gear 22 is attached to one end of a stub shaft 24 journaled in an upwardly inclined bearing 25 carried by a hanger or bracket member 19 which is carried by and extends radially within elbow tube 20. Stub shaft 24 is arranged coaxially with the outlet section of pipe elbow 20 and is provided with a portion of generally square cross sectional configuration. The distal end of stub shaft 24 is tapered to provide a pointed end.

Bracket 19 and bearings 18 and 25 form a gear box surrounding bevel gears 22 and 23 thereby preventing contact between grain moved by flighting 14 with gears 22 and 23 and also retain lubricants on gears 22 and 23 from contaminating the grain.

An unloading auger and tube assembly 26 having an outer tube 27 mounted about a central driven shaft 28 is positionable as an operative upward and outward extension of auger conveyer 11. Tube 27 is provided at its upper end with a bearing 29 (see Fig. 1) rotatably supporting shaft 28 having helical flighting 30 mounted thereabout. A discharge spout 31 is pivotally attached to the upper end of auger and tube assembly 26 in grain receiving relation thereto. The lower end of shaft 28 is provided with a coupling member 32 having a central opening 33 of square cross section complementary to stub shaft 24 and is telescopically receivable thereabout to form a driving connection therebetween. Elbow tube 20 is provided at the upper end thereof with a hinge portion 34, and a lower end portion of tube 27 is provided with like hinge portions 35 which are horizontally alignable with hinge portions 34 for receiving a pivot rod 36 (see Fig. 2).

It it is desired to have auger and tube assembly 26 rigidly attached to elbow tube 20, then an extended shaft 28' may be substituted for shaft 28. And this extended shaft can be attached directly to a gear 23' (as shown in Fig. 3) thereby eliminating stub shaft 24 and coupling element 32. However, in most self-propelled harvesters it is usually desirable to have the unloading auger assembly pivotally or detachably mounted so that it can be positioned in an out of the way transport position.

A U-bracket 37 (see Fig. 1) is attached to grain bin 3 with the upper surfaces of both coinciding. Bracket 37 has attached to the upper surface thereof, a pair of horizontally spaced latch receiving elements 38 only one of which is shown. Such latch receiving elements are adapted to receive a latch element 39, which is attached to an outer mid-portion of tube 27, when tube 27 has been pivoted to a vertical position about pivot rod 36.

U-bracket 37 operatively supports a spring biased latch pin 41 having an operating chain 42 attached to the lower end thereof. When it is desired to move auger tube assembly 26 to a vertical position, chain 42 is pulled downwardly moving latch pin 41 downwardly away from in front of latch receiving elements 38. Latch element 39 can then be moved into receiving elements 38 at which time the downward pull on chain 42 is released and pin 41 moves upwardly under the bias of its spring to a position retaining latch element 39 in receiving elements 38. If it is desired to lower auger tube assembly 26 to its operative position, a downward pull on chain 42 will move latch pin 41 out of engaging position with latch element 39 and then tube assembly 26 can be pivoted clockwise to the operative position shown in Fig. 1.

If further details of the latch mechanism or the means for raising auger assembly 26 to a transport position are desired such details can be found in application of John E. Hudgins, Serial No. 384,993, for Adjustable Grain Bin Unloading Auger Assembly, filed October 8, 1953, and which application has a common assignee with this application.

From the foreging it is seen that a pair of diverging auger conveyers having intersecting axes have been operatively connected by a means which eliminates excess vibration, occupies a minimum of space and eliminates damage to the material being conveyed by the two conveyers.

Now having described the invention, it is to be understood that the invention is not to be limited to the specific details herein set forth but only by the scope of the claims which follow.

It is claimed and desired to secure by Letters Patent:

1. In a machine of the character set forth, the combination of a material storage bin, an unloading auger type conveyer positioned above and adjacent the floor of said bin, said unloading conveyer being drivenly connected at one end to a power source carried by said machine, said unloading conveyer including a central drive shaft journaled at the power input end thereof in a side wall of said bin, an elbow tube attached at one of its ends to said bin in registering relation to a side opening of the latter opposite to said side wall and in concentric relation to said drive shaft, a hanger member carried by and extending radially within said tube, a bearing member carried by said hanger member in journaled relation to the other end of said drive shaft, a bevel gear member attached to said other end of said shaft, a second bearing member attached to said hanger member, a stub shaft rotatably supported in said second bearing member, a second bevel gear attached to an end of said second shaft and being positioned in meshed driven relation to said first bevel gear, said stub shaft being provided with a pointed other end of generally square cross sectional configuration, an extension auger assembly including an outer tube pivotally mounted for up and down movement on the other end of said elbow tube and adapted to be positioned to form an operative upward and outward angular extension of said unloading conveyer, a driven shaft mounted in said outer tube and having its upper end journaled in a bearing carried by the upper end of said outer tube, and a coupling member attached to the lower end of said driven shaft and being provided with an opening complementary to the other end portion of said stub shaft, said stub shaft being telescopically received within said coupling element to form a driving connection therebetween when said extension assembly is positioned as said angular extension of said unloading conveyer, said hanger member and said bearing members being so configured and arranged to form a complete covering for said gears.

2. In a combine harvester having a grain bin, the combination of a horizontally extending auger type conveyer including a drive shaft and helical flighting thereabout for moving grain toward a side aperture of said bin, a pipe elbow having a generally horizontal inlet section secured to said grain bin in registry with said side aperture and an outlet section extending on an upwardly inclined axis from said inlet section, a gear box within said elbow having a horizontal bearing portion and an upwardly inclined bearing portion coaxial, respectively, with said inlet and outlet sections of said elbow, a driving bevel gear within said gear box rotatably mounted in said horizontal bearing portion and connected in torque transmitting relation with said drive shaft, a stub shaft rotatably mounted in said inclined bearing portion, a driven bevel gear in mesh with said driving bevel gear secured to said stub shaft, an auger type elevating conveyer including a tube element and a central shaft and associated flighting enclosed within said tube element, pivot means mounting said elevating conveyer for adjustment relative to said elbow into and out of an operative position in which said elevating conveyer extends in longitudinal alignment with said upwardly inclined axis, and separable coupling means operatively interposed between said stub shaft and said central shaft of said elevating conveyer, said coupling means including a driving coupling member operatively associated with said stub shaft, and a driven coupling member operatively associated with said central shaft and movable into and out of cooperative engagement with said driving coupling member by said adjustment of said elevating conveyer relative to said elbow into and out of alignment, respectively, with said upwardly inclined axis.

References Cited in the file of this patent

UNITED STATES PATENTS

| 2,022,166 | Welty | Nov. 26, 1935 |
| 2,107,419 | Ketchpel | Feb. 8, 1938 |
| 2,465,309 | Happe et al. | Mar. 22, 1949 |
| 2,490,241 | Smith et al. | Dec. 6, 1949 |
| 2,528,275 | Heth | Oct. 31, 1950 |
| 2,585,414 | Steffens | Feb. 12, 1952 |